US010319026B2

(12) United States Patent
Maifeld et al.

(10) Patent No.: US 10,319,026 B2
(45) Date of Patent: Jun. 11, 2019

(54) METHOD, MEDIUM, AND SYSTEM FOR OVERAGE TOLERANCE FOR VARIABLE QUANTITY ITEMS

(71) Applicant: ORACLE INTERNATIONAL CORPORATION, Redwood Shores, CA (US)

(72) Inventors: Rebecca Maifeld, Brooklyn Park, MN (US); Brian Voelz, Minnetonka, MN (US); Steven Gooijer, Maple Grove, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 930 days.

(21) Appl. No.: 14/452,944

(22) Filed: Aug. 6, 2014

(65) Prior Publication Data

US 2016/0042439 A1 Feb. 11, 2016

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0635* (2013.01); *G06Q 10/087* (2013.01)

(58) Field of Classification Search
CPC ................. G06Q 30/0635; G06Q 10/087
See application file for complete search history.

(56) References Cited

U.S. PATENT DOCUMENTS

| 7,664,684 | B2 | 2/2010 | Boerner et al. | |
|---|---|---|---|---|
| 2010/0212267 | A1* | 8/2010 | Salom Espana | G01G 19/393 53/473 |

OTHER PUBLICATIONS https://chrislema.com/woocommerce-variable-pricing-one-size-doesnt-fit-all/ (Year: 2012).*

* cited by examiner

*Primary Examiner* — Matthew E Zimmerman
(74) *Attorney, Agent, or Firm* — Kraguljac Law Group, LLC

(57) ABSTRACT

Systems, methods, and other embodiments associated with order fulfillment using overage tolerance to verify amounts of variable quantity items are described. In one embodiment, a method includes receiving, in a device, a customer order for an item. The customer order indicates at least an ordered amount of the item. The example method may also include determining a unit type of the item. The unit type defines whether the item is measured in discrete unitary quantities or is measured in variable quantities. The method may also include verifying that a picked amount of the item for the customer order is within an overage tolerance of the ordered amount when the unit type indicates variable quantities. The overage tolerance is an upper bound over the ordered amount that is permissible to satisfy the customer order.

20 Claims, 3 Drawing Sheets

METHOD, MEDIUM, AND SYSTEM FOR OVERAGE TOLERANCE FOR VARIABLE QUANTITY ITEMS

BACKGROUND

Fulfilling electronic direct-to-consumer orders may include processing orders for many different types of items. The types of items may include groceries (e.g., produce, grains, etc.), electronics, clothing and so on. In general, the items are sold in discrete units and quantities. When a customer places an order, the order is for a specified quantity of a product (e.g., one telephone, two large shirts, a dozen cans of soda and so on).

However, not all items conform well to being sold as discrete units. For example, an order for one bunch of grapes or one bunch of bananas may vary drastically in actual weight. Because these items are generally valued according to weight, selling these items as discrete units can cause difficulties with selecting and valuing items appropriately. Additionally, selling these items by weight or another unit of measure can cause difficulties with imprecision in measuring an exact ordered amount. For example, produce, grains and more generally any item that is valued according to a non-discrete quantity may cause difficulties when fulfilling orders for these items electronically. This is because these items are sold according to a varying quantity of measurement and are not discrete items that are easily divisible or otherwise measurable to an ordered amount.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that verify amounts of variable quantity items according to an overage tolerance. Variable quantity items are items that are valued according to a variable unit of measure (e.g., weight, length, etc.). For example, a variable quantity item is dividable into a specified quantity that is not discretely defined. Variable quantity items are often difficult to measure to exact quantities. Thus, in one embodiment, variable quantity items are defined within an inventory system along with an overage tolerance. The overage tolerance defines an amount over an ordered amount of the item that is permissible for fulfilling the order. Accordingly, a consumer accepts that ordering variable quantity items will likely result in the order being fulfilled with an amount that is within a range defined by the overage tolerance instead of an exact ordered amount.

For example, orders are received through a website or other electronic medium. Each order specifies an ordered amount for an item that is then picked from the inventory to fulfill the order. If a picked amount is within the overage tolerance (i.e., less than) that is defined for that item then the picked amount completes a picking process for the item. However, if the picked amount exceeds the overage tolerance, then the item is, for example, re-picked until the picked amount satisfies the overage tolerance. In this way, using the overage tolerance simplifies selling and picking items that are measured in variable quantities and provides the consumer with confidence the item will be fulfilled within a specific range of the ordered amount.

Figure 1:
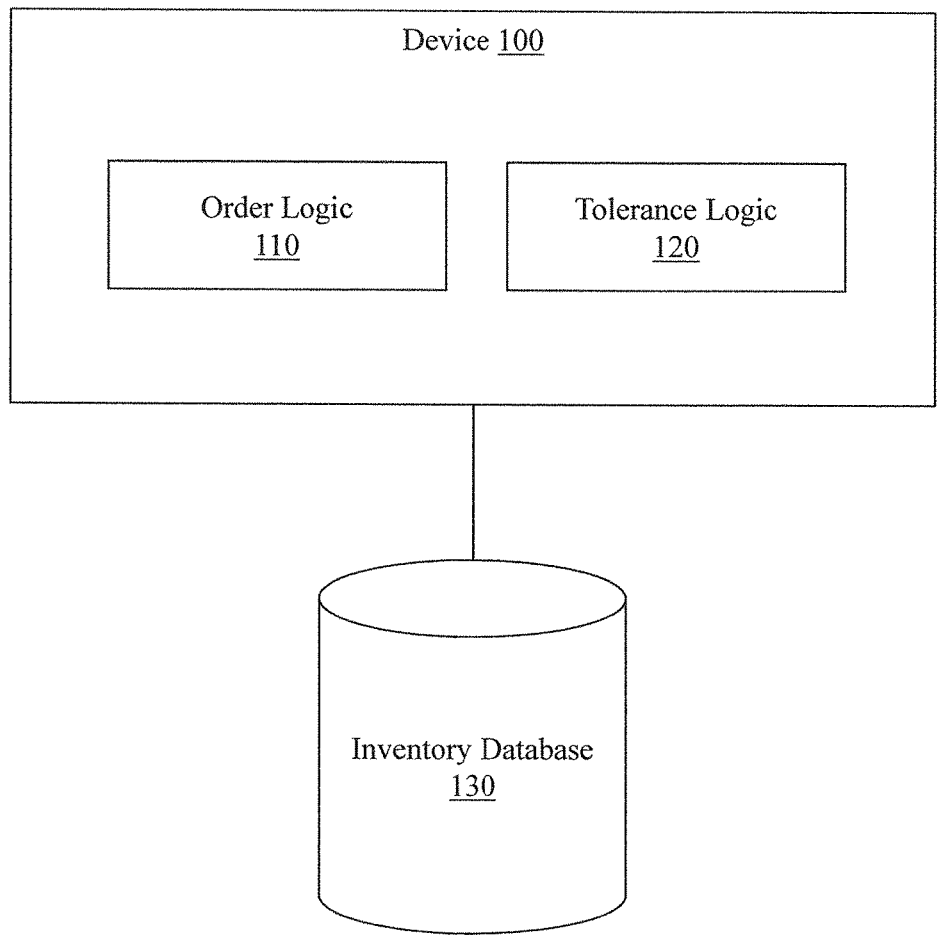
FIG. 1 illustrates one embodiment of a device associated with fulfilling orders for items by selecting the items according to an overage tolerance.

With reference to FIG. 1, one embodiment of a device 100 associated with using overage tolerances with items measured in variable quantities is illustrated. In one embodiment, the device 100 includes order logic 110 and tolerance logic 120 that together handle orders and ensure picked amounts of variable quantity items comply with overage tolerances. An inventory database 130 stores information about a plurality of items that are consumer products (e.g., groceries, hardware, clothing, etc.) in an inventory. Items in the inventory database may be displayed to users electronically for generating customer orders and subsequently processing the customer orders.

In general, the order logic 110 is configured to generate entries in the inventory database 130 to initially define the items for purchase. For example, the order logic 110 generates representations of the items in the inventory database 130 using information that defines various attributes of each item. The attributes include information about each item such as, for example, a description, picture, price, SKU number and so on. In one embodiment, the attributes include a unit type and a product type.

The unit type defines how an item is measured and sold. That is, the unit type indicates a unit of measure (UoM) for the item. Additionally, the unit type indicates whether the item is measured in discrete unitary quantities or is measured in variable quantities. Items that are sold in discrete unitary quantities are items that are characterized by discrete predefined units which are not generally divisible. These discrete quantity items may include electronics (e.g., a smartphone), clothing (e.g., a shirt) or simply anything that is defined as an integer whole unit that is not generally sold according to a measured quantity in divisible units (e.g., by weight or length).

By contrast, items that are sold according to variable quantities are generally characterized by measuring an amount of an item on a per order basis and valuing the item according to a measured amount. Additionally, a variable quantity item is generally measurable in continuous amounts that are not predefined portions or distinct units. For example, variable quantity items include produce (e.g., grapes, bananas, potatoes, grains, flour, meat, etc.), hardware (e.g., chain, rope), building supplies (e.g., sand, rock) and so on. While some of these items may have distinct sub-units (e.g., each banana in a bunch), the units have intrinsic variations in measured quantities (e.g., weight). Thus, selecting variable quantity items according to a sub-unit does not provide a reliable measure of a value of the sub-unit.

As previously mentioned, the attributes also include a product type. The product type defines a class for an item in, for example, a merchandise hierarchy. In general, an item is associated with a specific hierarchy (e.g., class or subclass) that indicates a group of items that have a similar unit of measure range. The merchandise hierarchy may be used when defining an overage tolerance. For example, the merchandise hierarchy may indicate a high value item (e.g., caviar) versus a low value item (e.g., catfish). Accordingly, different class/subclasses in a merchandise hierarchy may denote different overage tolerances.

In one embodiment, the order logic 110 is configured to use the product type when defining an overage tolerance for an item so that the overage tolerance reflects a value of the item. Because a slight overage for a high value item (e.g., caviar) may result in a much greater price difference than a slight overage for a low value item (e.g., catfish), the order logic 110 may base the overage tolerance on the product type. That is, the overage tolerance for a high value item may be a much lower percent or quantity than a percent used for a low value item. In this way, price variations between an ordered amount and a picked amount that is within the overage tolerance can be reduced.

In one embodiment, the order logic 110 is configured to define the overage tolerance as a percent of an ordered amount, a discrete quantity or a combination of the percent and the discrete quantity. The discrete quantity is a discrete predefined amount over the ordered amount by which a picked amount may exceed the ordered amount. The picked amount is an amount selected from inventory to fulfill an order. Thus, the overage tolerance permits picking amounts for an ordered item from inventory that are greater than an ordered amount. Thus, the overage tolerance facilitates filling orders for items that are measured according to variable quantities.

The order logic 110 may also define the overage tolerance as a percent of the ordered amount. Defining the overage tolerance as a percent permits the picked amount to exceed the ordered amount by an amount that is relative to the ordered amount. As an example, if the overage tolerance for coffee is set to 10% and an order is for 20 oz, then a picked amount that is provided to fulfill the order may be up to 22 oz. In general, the overage tolerance is an upper bound. Therefore, an amount lower (e.g., 15 oz) than an ordered amount may also be considered permissible to fulfill the order even if the picked amount is less than the ordered amount.

Additionally, the order logic 110 may base the overage tolerance on the product type by limiting a percent or discrete amount when the item is of higher value. In this way, variations between a total price expected by a consumer and an actual price from the picked amount do not vary by large amounts.

Furthermore, when the order logic 110 defines the overage tolerance as a combination of the discrete amount and a percent, a picked amount may not, for example, exceed either the percent or the discrete amount. To continue the previous coffee example, suppose that the overage tolerance is defined as 10% (percent overage) or 1 oz (discrete overage). In this example, the previous order for 20 oz would have an upper bound of 21 oz according to the overage tolerance. This is because the percent overage would be 22 oz while the discrete overage would be 21 oz for this order.

By contrast, if the ordered amount of coffee was 8 oz, then the upper bound for the picked amount would be 8.8 oz, which correlates with the percentage overage. Because the discrete overage would be higher at 9 oz, the percent overage tolerance is applied instead. In this way, the order logic 110 can configure the overage tolerance to account for a wide range of order amounts while still ensuring an acceptable overage amount.

The following discussion of the device 100 will proceed by explaining various aspects of fulfilling an example order for a variable quantity item. In this example, the item will be discussed as produce (e.g., grapes). Of course, variable quantity items are not limited to produce but include a broad selection of items.

The order logic 110 is configured to receive orders for items that are sold on an e-commerce website or through some other electronic media. In one embodiment, the orders are for items that are defined in the inventory database 130. Accordingly, suppose that an order arrives at the order logic 110 for fulfillment. In general, the order includes information such as an ordered amount of an item, a total price and other order related information.

In this example, the order is for 1.5 pounds of grapes priced at $2.00/lb. Accordingly, upon receiving the order the order logic 110 is configured to determine whether one or more items in the order are variable quantity items. If an item is a variable quantity item then, in one embodiment, along with generating a message to pick the item from stock, the order logic 110 indicates the overage tolerance along with the ordered amount of the item. Because the grapes are a variable quantity item, an overage tolerance is defined for the grapes and a message is generated to pick the 1.5 lbs of grapes.

Suppose in this example that the overage tolerance is a percent overage (e.g., 10%). Thus, a picked amount of grapes that may be used to fulfill the order is within 10% of the ordered amount, which makes the overage tolerance an upper bound of 1.65 lbs in this example. Accordingly, after the ordered item is gathered/picked from an available inventory on behalf of the customer, the tolerance logic 120 verifies whether the picked amount satisfies the overage tolerance. That is, the tolerance logic 120 determines whether the picked amount is less than the overage tolerance (e.g., picked amount<(ordered amount+10%)).

As an example of how the tolerance logic 120 verifies the picked amount using the overage tolerance, consider that a first bunch of grapes that are picked from the inventory weigh 1.75 lbs. Because the picked amount exceeds the overage tolerance of 1.65 lbs, the tolerance logic 120 will generate an alert or other message indicating that the picked amount is not within an acceptable range. Accordingly, a different bunch of grapes are selected and weighed. This time, the picked amount weighs 1.6 lbs and is thus within the overage tolerance of 1.65 lbs, which means that the picked amount satisfies the overage tolerance.

In general, the tolerance logic 120 will cause the picked amount to be re-picked until the picked amount falls within the overage tolerance. When an amount cannot be picked that satisfies the overage tolerance the item may be skipped or otherwise removed from the being picked. For example, when an inventory of watermelons all exceed the overage tolerance for an ordered amount, the watermelons may be skipped as being incapable of being fulfilled. In one embodiment, the tolerance logic 120 may generate a notification to the customer to request an exception to the overage tolerance or to have the customer delete the item from the order. In either case, the tolerance logic 120 will generally not fulfill an item within an order when the item cannot be picked within a specified overage tolerance.

While the overage tolerance is discussed as being defined with a percent, a discrete amount or both, of course, the overage tolerance may be defined in several ways. In another embodiment, the overage tolerance is defined according to intervals. That is, for example, an overage tolerance for 0 to 1 lbs may be 0.05 lbs, for 1-5 lbs may be 5%, for 5-20 lbs it may be 0.5 lbs and so on. In general, the overage tolerance is configurable in many different ways but generally provides for fulfilling orders by using an amount beyond what was actually ordered.

Once a picked amount satisfies the overage tolerance, the tolerance logic 120 may evaluate the picked amount to determine a total price for the order. Returning to the grapes example, an original total price for 1.5 lbs of grapes would be $3.00. Once the tolerance logic 120 evaluates the order in light of the picked amount of 1.6 lbs the total price is modified to be $3.20.

Whether the total price is re-evaluated may be based on the product type (e.g., value) of the item, price calculation policies and so on. However, a total price may be modified to reflect the picked amount that is provided to a customer in order to accurately account for overage picking.

Figure 2:
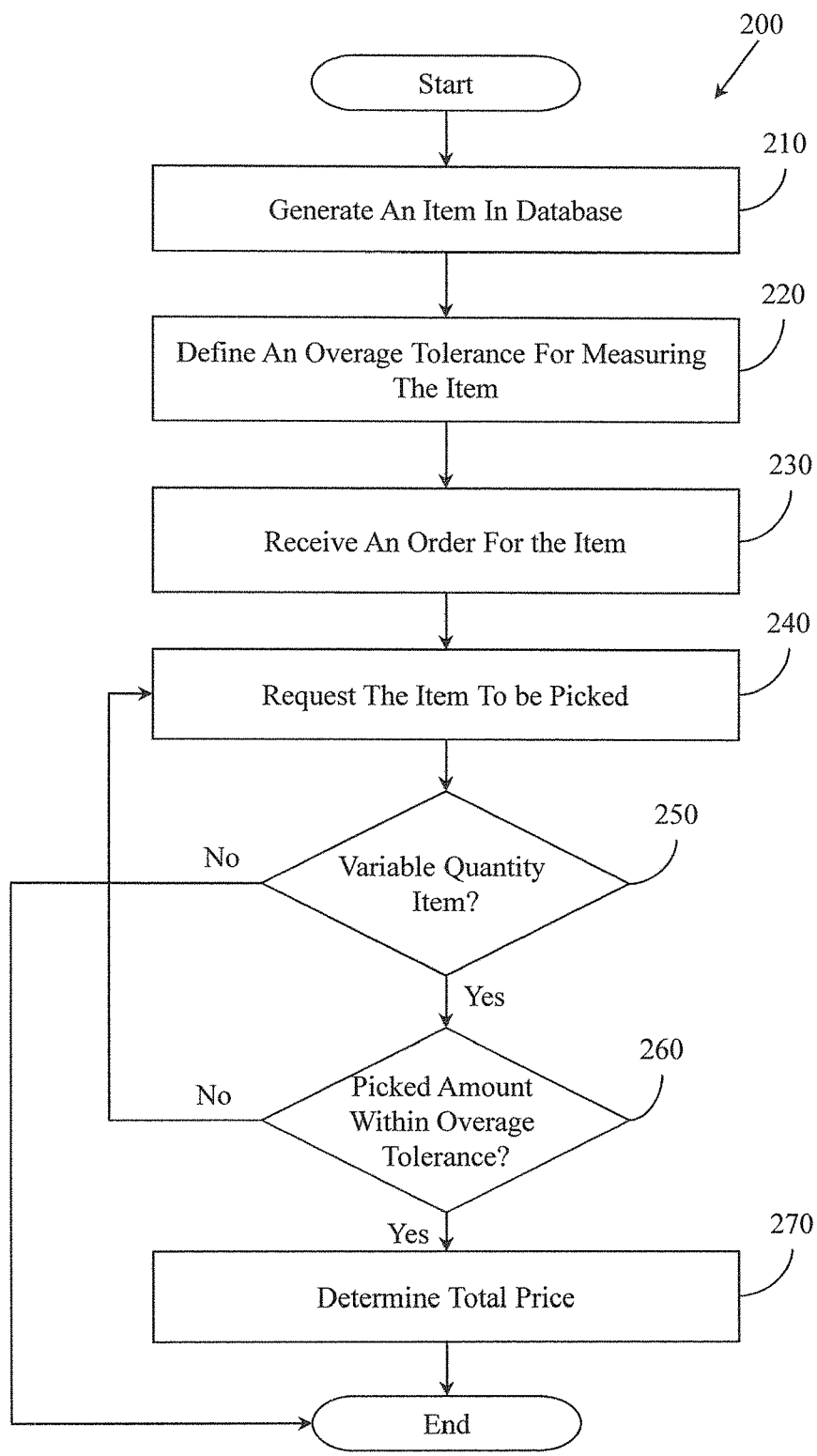
FIG. 2 illustrates another embodiment of a method associated with using overage tolerances to ensure ordered amounts of variable quantity items are fulfilled within a permissible range.

Further aspects of using overage tolerances when picking variable quantity items will be discussed with relation to FIG. 2. FIG. 2 illustrates a method 200 associated with implementing overage tolerances to simplify picking variable quantity items.

At 210, an entry that represents an item is generated in an inventory database. In general, the inventory database includes a plurality of entries that represent various items of a retail inventory. The items may include grocery items, hardware, clothing and so on. These items are defined by attributes that include, at least, a unit type and a product type for each item. In one embodiment, the attributes include additional information such as descriptions, pictures, reviews and so on.

At 220, an overage tolerance is defined for the item according to the product type and the unit type. That is, if the unit type indicates an item that is sold on according to a variable quantity of measure then the overage tolerance is defined at 220. In general, the overage tolerance is defined in accordance with the product type. The product type defines a class/subclass for the item in a merchandise hierarchy. In one embodiment, the class/subclass is associated with a base value of the item. That is, the product type indicates whether the item is a high value item (e.g., saffron or caviar) or a low value item (e.g., catfish or bananas) per unit of measure and, for example, a unit of measure for the item.

In either case, the product type may influence a quantity that is defined for the overage tolerance depending on a specific implementation. The unit type indicates whether the item is sold in variable quantities and thus uses an overage tolerance for measuring an amount of the item on a per order basis.

Accordingly, in one embodiment, the overage tolerance is defined as an overage percentage, an overage quantity or a combination of the two. While the overage percentage and the overage quantity are discussed as options for the overage tolerance, of course, in other embodiments, the overage tolerance may be implemented in many different ways (e.g., intervals, dynamically scaled, etc.)

However, in general, the overage percentage defines a percent of an ordered amount by which a picked amount may exceed the ordered amount. The overage quantity defines a discrete quantity by which the picked amount may exceed the ordered amount. By permitting the picked amount that is selected to fulfill the order to exceed the ordered amount, difficulties with measuring exact amounts and selecting items that vary in weight can be simplified.

At 230, a customer order is received for an item at a retail location or other location from which the customer order will be fulfilled. In general, the customer order is generated through an e-commerce website or other electronic media as a transaction for goods. Accordingly, the customer order may include ordered amounts of one or more items and item numbers, delivery information (e.g., store pick-up, delivery address), a total price and so on.

Accordingly, a request is generated for the items to be picked from stock/inventory at 240. In one embodiment, at 240, the request causes the picked amount to be selected from an inventory that includes stock of the item to satisfy the customer order. The request may include information about the one or more items, such as ordered amounts, overage tolerances and so on.

At 250, items in the customer order are analyzed to determine a unit type of the items. If an item is not a variable quantity item then the item is picked normally (e.g., discrete units selected from inventory) and a picked quantity is not analyzed further. However, when items in the customer order are variable quantity items then additional procedures in analyzing an ordered quantity of the item may be followed to ensure proper quantities are picked and provided for the order.

At 260, a picked amount is verified to ensure it is within an overage tolerance. As previously mentioned, the overage tolerance is an upper bound over the ordered amount that is permissible to satisfy the customer order. Using the overage tolerance ensures the picked amount is permissible for fulfilling the customer order. That is, in general, the overage tolerance is an amount over an ordered amount that is acceptable to a consumer purchasing an item. Because variable quantity items are difficult to measure to exact quantities, the consumer accepts that ordering such items will likely result in the order being fulfilled with an amount of the item that is within a range defined by the overage tolerance. In this way, the consumer can electronically order variable quantity items and have confidence in knowing that a charged amount will be within a known range.

Consequently, if the picked amount of the item exceeds the overage tolerance, then, for example, a message (e.g., error message or other indicator) is generated to indicate the picked amount does not comply with the overage tolerance. In one embodiment, the message causes a request to be generated, at 240, for the item to be re-picked. In general, picking and verifying whether the picked amount is within the overage tolerance repeats until the picked amount is verified as being within the overage tolerance (e.g., picked amount<(ordered amount+overage tolerance)).

In one embodiment, additional conditions or policies may dictate how the re-picking occurs. For example, if the item is re-picked and a picked amount fails to be within the overage tolerance more than a predefined number of times, then the item may be cancelled, altered or otherwise change in the order so that the order can be completed. In another embodiment, if an inventory of the item is below a predefined number/amount and the item has been re-picked more than the predefined number, then the item may be cancelled from the order. Of course, while cancelling items from the order is discussed, actions that occur according to not being able to pick an item to satisfy the overage tolerance may be implementation specific.

Accordingly, by providing amounts to fulfill an order that may exceed the ordered amount overage picking can be reduced to within specified limits of the overage tolerance. Additionally, improved granularity in selecting the picked amount is provided since exact quantities for variable quantity items need not be conformed to.

After an acceptable amount has been picked and verified, at 270, a total price of the customer order may be determined according to the picked amount. In this way, an original total price can be modified to reflect the picked amount that is provided as a fulfilled amount with the customer order to a customer.

Computer Embodiment

Figure 3:
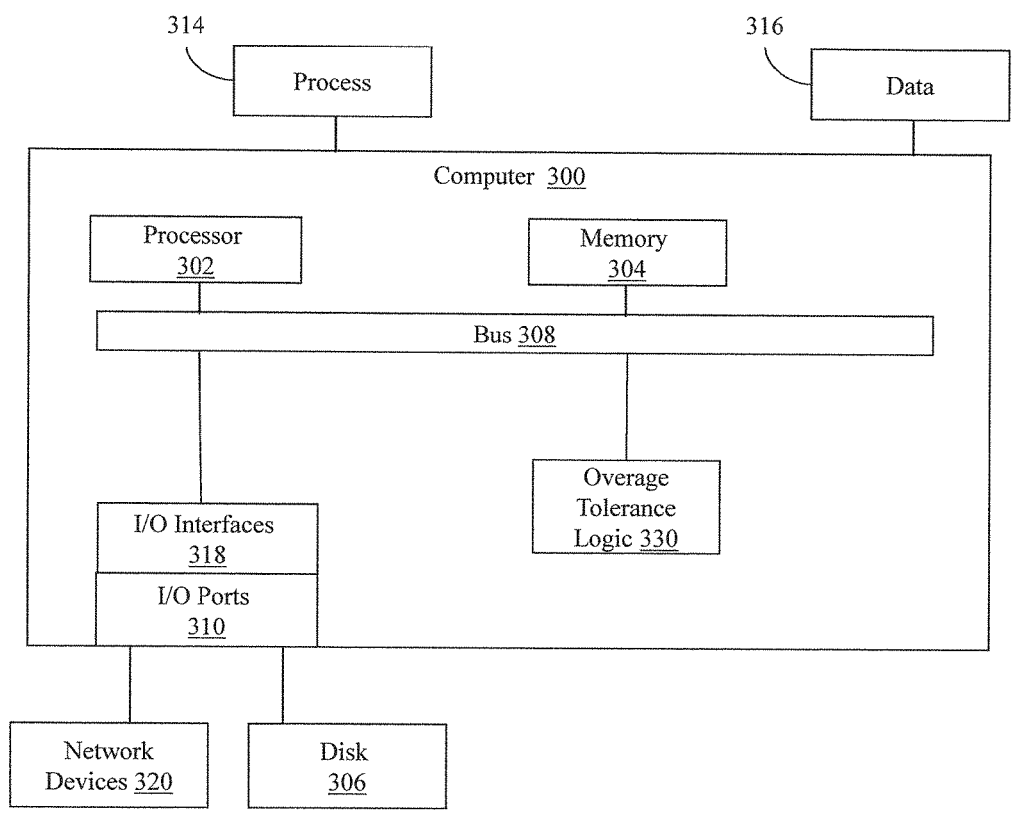
FIG. 3 illustrates an embodiment of a computing system configured with the example systems and/or methods disclosed.

FIG. 3 illustrates an example computing device that is configured and/or programmed with one or more of the example systems and methods described herein, and/or equivalents. The example computing device may be a computer 300 that includes a processor 302, a memory 304, and input/output ports 310 operably connected by a bus 308. In one example, the computer 300 may include overage tolerance logic 330 configured to facilitate fulfilling orders for variable quantity items similar to order logic 110 and tolerance logic 120 shown in FIG. 1. In different examples, the overage tolerance logic 330 may be implemented in hardware, a non-transitory computer-storage medium with stored instructions, firmware, and/or combinations thereof. While the overage tolerance logic 330 is illustrated as a hardware component attached to the bus 308, it is to be appreciated that in one example, the overage tolerance logic 330 could be implemented in the processor 302.

Generally describing an example configuration of the computer 300, the processor 302 may be a variety of various processors including dual microprocessor and other multiprocessor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output devices via the i/o interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the i/o interfaces 318, and/or the i/o ports 310. Through the network devices 320, the computer 300 may interact with a network. Through the network, the computer 300 may be logically connected to remote computers. Networks with which the computer 300 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method performed by a computing device including at least a processor for executing stored instructions, the method comprising:
   receiving, by the computing device via a network communication from a remote device, a customer order for an item, wherein the customer order indicates at least an ordered amount of the item;
   accessing, by the processor, a database to identify a record corresponding to the item, and retrieving attributes for the item from the record including a unit type of the item;
   determining, by the processor, the unit type of the item, wherein the unit type defines whether the item is measured in a discrete unitary quantity or is measured in a variable quantity;
   in response to determining the unit type defines the variable quantity, defining an overage tolerance that sets a limit for picking an amount of the item from an inventory that exceeds the ordered amount;
   generating, by the processor, a request to pick the item from the inventory, the request indicating the overage tolerance along with the ordered amount of the item; and
   transmitting, by the processor, the request to a second computer, to cause the ordered amount to be selected from the inventory, wherein an amount of the item actually selected is a picked amount of the item;
   wherein the request further controls the second computer to cause the second computer to: (i) verify that the picked amount of the item for the customer order is within the overage tolerance of the ordered amount when the unit type indicates variable quantities, wherein the overage tolerance is an upper bound over the ordered amount that is permissible to satisfy the customer order, and accounts for an imprecision in measuring the picked amount of the item that interferes with order fulfillment; and
   (ii) in response to the picked amount of the item exceeding the overage tolerance, generate an indicator causing the picked amount of the item to be re-picked in an attempt to cause the picked amount of the item to fall within the overage tolerance.

2. The method of claim 1, wherein the picked amount is selected from the inventory that includes stock of the item to satisfy the customer order by a user, wherein measuring the item is characterized by discrete predefined units for distinguishing between units of the item when the unit type indicates the discrete unitary quantity, wherein measuring the item is characterized by measuring an amount of the item on a per order basis when the unit type indicates variable quantities, and wherein when the unit type indicates variable quantities the item is measurable in continuous amounts that are not predefined portions or distinct units.

3. The method of claim 1, further comprising
   generating, in the database, the record of the item that represents a consumer product by defining attributes of the item that include, at least, the unit type and a product type, wherein the product type indicates a class within a merchandise hierarchy for valuing the item per unit of measure, and wherein the overage tolerance is based, at least part, on the product type.

4. The method of claim 1, wherein the item is one of a plurality of items in a retail inventory, wherein the plurality of items are grocery items, and wherein verifying that the picked amount is within the overage tolerance ensures the picked amount is permissible for fulfilling the customer order.

5. The method of claim 1, further comprising:
   defining the overage tolerance for measuring the item when the unit type is indicates the variable quantity, wherein the overage tolerance is defined as an overage percentage, an overage quantity or a combination of the overage percentage and the overage quantity, wherein the overage quantity is a discrete predefined amount over an ordered amount by which the picked amount may exceed the ordered amount, and wherein the overage percentage is a percent of the ordered amount by which the picked amount may exceed the ordered amount.

6. The method of claim 1, wherein the product type indicates a class within a merchandise hierarchy of the inventory, wherein the class within the merchandise hierarchy indicates a unit of measure for the item and a valuation per unit of measure of the item, and wherein the overage tolerance is a function of the class within the merchandise hierarchy.

7. A computing system, comprising:
   a memory;
   at least one processor connected to the memory;
   a non-transitory computer readable medium comprising stored instructions that when executed by the at least one processor, cause the at least one processor to:
   receive, by the processor via a network communication from a remote device, a customer order for an item, wherein the customer order indicates at least an ordered amount of the item;
   access, by the processor, a database to identify a record corresponding to the item, and retrieving attributes for the item from the record including a unit type of the item;
   determine, by the processor, the unit type of the item, wherein the unit type defines whether the item is measured in a discrete unitary quantity or is measured in a variable quantity;

in response to determining the unit type defines the variable quantity, define an overage tolerance that sets a limit for picking an amount of the item from an inventory that exceeds the ordered amount;

generate, by the processor, a request to pick the item from the inventory, the request indicating the overage tolerance along with the ordered amount of the item;

transmit, by the processor, the request to a second computer, to cause the ordered amount to be selected from the inventory, wherein an amount of the item actually selected is represented as a picked amount;

wherein the request further controls the second computer to cause the second computer to: (i) verify, by the processor, that the picked amount of the item for the customer order is within the overage tolerance of the ordered amount when the unit type indicates variable quantities, wherein the overage tolerance is an upper bound over the ordered amount that is permissible to satisfy the customer order; and (ii) in response to the picked amount of the item exceeding the overage tolerance, generate an indicator causing the picked amount of the item to be re-picked from inventory in an attempt to cause the picked amount of the item to fall within the overage tolerance.

8. The computing system of claim 7, wherein the picked amount is a selected amount from the inventory that includes stock of the item to satisfy the customer order, wherein the discrete unitary quantity for an item includes a discrete predefined unit for distinguishing between units, wherein variable quantity items are measured according to variable quantities on a per order basis, and wherein variable quantity items are measurable in continuous amounts that are not predefined portions or distinct units.

9. The computing system of claim 7, wherein the instructions further comprise stored instructions that when executed cause the processor to generate, in the database, the item that represents a consumer product by defining attributes of the item that include, at least, the unit type and a product type, wherein the product type indicates a class for valuing the item per unit of measure, and wherein the overage tolerance is based, at least part, on the product type.

10. The computing system of claim 7, wherein the item is one of a plurality of items in a retail inventory, wherein the plurality of items are grocery items, and wherein the tolerance logic is configured to verify that the picked amount is within the overage tolerance to ensure the picked amount is permissible to fulfill the customer order.

11. The computing system of claim 7, wherein the instructions further comprise stored instructions that when executed cause the processor to define the overage tolerance for measuring the item when the unit type is variable quantity, wherein the overage tolerance is defined as an overage percentage, an overage quantity or a combination of the overage percentage and the overage quantity, wherein the overage quantity is a discrete predefined amount over the ordered amount by which the picked amount may exceed the ordered amount, and wherein the overage percentage is a percent of the ordered amount by which the picked amount may exceed the ordered amount.

12. The computing system of claim 7, wherein the instructions further comprise stored instructions that when executed cause the processor to, in response to verifying that the picked amount is within the overage tolerance, determine a total price of the customer order according to the picked amount to modify the total price to reflect the picked amount that is provided to fulfill the customer order to a customer.

13. The computing system of claim 7, wherein the indicator generated includes an error message that causes the item to be re-picked so that the picked amount complies with the overage tolerance.

14. A non-transitory computer storage medium storing instructions that when executed by a computing device including a processor cause the processor to:

in response to receiving a customer order for an ordered amount of an item and a discrete unitary quantity of a different item, request the ordered amount of the item and the discrete unitary quantity of the different item to be picked from an inventory;

verify that a picked amount of the item for the customer order is within an overage tolerance of the ordered amount when a unit type of the item indicates a variable quantity, wherein the overage tolerance is an upper bound over the ordered amount that is allowable to fulfill the customer order;

in response to the picked amount exceeding the overage tolerance, the processor generating an indicator causing the picked amount of the item to the re-picked from the inventory in an attempt to cause the picked amount to fall within the overage tolerance; and in response to a failure of the picked amount of the item to fall within the overage tolerance after a defined number of attempts to re-pick the picked amount of the item, modifying the ordered amount in the customer order to: (i) prevent a further attempt to re-pick the picked amount of the item, and (ii) without the ordered amount of the item being picked, cause the customer order to be fulfilled by picking the discrete unitary quantity of the different item included in the request.

15. The non-transitory computer storage medium of claim 14, wherein the instructions are configured to determine a unit type of the item, wherein the unit type defines whether the item is measured in the discrete unitary quantity or is measured in the variable quantity, and wherein items that are measured according to the discrete unitary quantity are provided according to integer whole units.

16. The non-transitory computer storage medium of claim 14, wherein the instructions configured to request the order amount to be picked include instructions that when executed by the processor cause items that are measured according to the variable quantity to be measured on a per order basis, and wherein the variable quantity is measurable in continuous amounts that are not predefined portions or distinct units.

17. The non-transitory computer storage medium of claim 14, wherein the instructions are configured to verify that the picked amount is within the overage tolerance to reduce overage picking and provide granularity in selecting the ordered amount.

18. The non-transitory computer storage medium of claim 14, wherein the instructions are configured to define the overage tolerance for measuring the item when the unit type is the variable quantity, wherein the overage tolerance is defined as an overage percentage, an overage quantity or a combination of the overage percentage and the overage quantity, wherein the overage quantity is a discrete predefined amount over the ordered amount by which the picked amount may exceed the ordered amount, and wherein the overage percentage is a percent of the ordered amount by which the picked amount may exceed the ordered amount.

19. The non-transitory computer storage medium of claim 14, wherein the instructions configured to verify a picked amount of the item include instructions configured to provide items of the inventory that are measured according to the discrete unitary quantity according to integer whole units while providing items of the inventory that are measured according to the variable quantity according to a fractional measurement on a per order basis.

20. The method of claim 1 further comprising:
   receiving, in the customer order, an order for a quantity of a different item;
   determining, by the processor, that the different item is measured in the discrete unitary quantity;
   modifying, by the processor, the request to include the different item; and
   in response to a failure of the picked amount of the item to fall within the overage tolerance after a defined number of attempts to re-pick the picked amount of the item, modifying the ordered amount of the item in the customer order to: (i) prevent a further attempt to re-pick the picked amount of the item, and (ii) without picking the ordered amount of the item, cause the customer order to be fulfilled by picking the discrete unitary quantity of the different item included in the request.

* * * * *